United States Patent [19]

Rocholl et al.

[11] Patent Number: 4,457,965
[45] Date of Patent: Jul. 3, 1984

[54] PROCESS FOR LACQUERING ARTICLES & ARTICLES LACQUERED THEREWITH

[75] Inventors: Johan P. Rocholl, Zwijndrecht; Hendrikes De Jong, Maasdam, both of Netherlands

[73] Assignee: Hunter Douglas International N.V., Netherlands

[21] Appl. No.: 345,727

[22] Filed: Feb. 4, 1982

[30] Foreign Application Priority Data

Mar. 16, 1981 [NL] Netherlands ................. 8101280

[51] Int. Cl.³ .................................. D06N 7/04
[52] U.S. Cl. ......................... 428/141; 427/262;
427/274; 427/355; 427/375; 427/385.5;
427/388.2; 427/407.1; 428/147; 428/425.8;
428/458
[58] Field of Search ............... 427/287, 256, 355, 359,
427/271, 375, 258, 262, 274, 385.5, 264, 388.1,
388.2, 388.5, 407.1, 409, 429; 428/458, 457, 480,
461, 474.4, 423.1, 500, 473.5, 425.8, 141, 147

[56] References Cited

U.S. PATENT DOCUMENTS

| | | | |
|---|---|---|---|
| 2,279,771 | 4/1942 | Austin | 427/375 |
| 2,279,774 | 4/1942 | Bolton | 427/375 |
| 2,293,420 | 8/1942 | Wick | 427/388.1 |
| 2,335,930 | 12/1943 | Freeland et al. | 427/375 |
| 3,032,448 | 5/1962 | Siebel et al. | 427/388.1 |
| 3,097,105 | 7/1963 | Edmonds | 427/388.1 |
| 4,095,002 | 6/1978 | Katsimbas | 427/375 |

FOREIGN PATENT DOCUMENTS

| | | | |
|---|---|---|---|
| 1644711 | 1/1971 | Fed. Rep. of Germany . | |
| 1669156 | 5/1971 | Fed. Rep. of Germany . | |
| 22438123 | 3/1974 | Fed. Rep. of Germany | 427/388.1 |
| 53-133245 | 11/1978 | Japan | 427/375 |
| 57-10373 | 1/1982 | Japan | 427/388.1 |
| 860313 | 2/1961 | United Kingdom | 427/388.5 |
| 611689 | 5/1978 | U.S.S.R. | 427/388.5 |

Primary Examiner—Sadie L. Childs
Attorney, Agent, or Firm—Pennie & Edmonds

[57] ABSTRACT

The wear resitance and other properties of a lacquer are improved by incorporation therein of particles of a high molecular, inert, wear-resistant plastics material having a diameter of 2 to 200 microns. Such a lacquer is particularly useful for application to metals and may be stored after application.

6 Claims, No Drawings

PROCESS FOR LACQUERING ARTICLES & ARTICLES LACQUERED THEREWITH

DESCRIPTION

The invention relates to lacquers and their use.

The invention provides a novel lacquer, a process for lacquering articles with this lacquer and, if desired, then stoving them, and shaped articles which have been lacquered in this manner. These articles can consist of end products or of semi-finished goods.

Depending on the end use, different binders are employed in lacquers, each having specific advantages and disadvantages in respect of durability, adhesion, flexibility, hardness and processability. These properties are in particular important for stoving lacquers which, after stoving, must, together with the material to which they have been applied, be able to withstand a, sometimes very severe, deformation. This last statement is especially true of the so-called "coil coating" lacquers. The known lacquers each have differing good and, in some cases, less good properties, whereby their use is directly or indirectly restricted, such properties including, for example, weathering resistance and limited scope for colouring. Some examples of known such lacquers are melamine-alkyd resins and lacquers based on acrylates, polyesters, polyurethanes, plastisols and the like.

Additives for improving certain properties, for example for obtaining an attractive, matt outer surface, are also known.

There still remains a need for a lacquer and a process for lacquering articles, which result in a lacquer layer which combines all the following properties:
(a) good resistance to ultraviolet light;
(b) good hardness (measured e.g. as the pencil hardness);
(c) good adhesion to metals and primers;
(d) good resistance to wear;
(e) unlimited choice of colour;
(f) low soiling;
(g) visual attractiveness and
(h) not excessively high price per m$^2$.

For articles which after lacquering still require to be shaped, the lacquer layer must moreover possess very good flexibility.

Such lacquers should, regardless of their type of drying or hardening mechanism, have very general usefulness for numerous purposes, including use on materials which are exposed outdoors, to sunlight, and to atmospheric factors. In particular, these remarks relate to products which are used in construction and buildings, such as roof claddings, gable claddings, outdoor slatted blinds, roller blinds and the like, and also to products used on motor vehicles.

Such products are frequently produced from lacquered metal strip in rolls. The material for this purpose is taken from the roll for continuous lacquering and stoving and is then (frequently in another factory) shaped to the desired shape and dimensions. It is clear that, in particular, severe profiling, for example by bending through 180°, makes great demands on the flexibility and adhesion of the lacquer, whilst the other properties at the same time must not deteriorate.

Because it is particularly at the apex of the bends that the lacquer layer is stretched and becomes thin, and wear frequently occurs first at the apex, it is clear that for a number of applications the wear resistance is of critical importance.

Hitherto, a lacquer with sufficient hardness, adhesion and flexibility has usually been selected. In order also to obtain reasonable resistance to wear, a wax was then also added to the lacquer, which wax, during hardening, drying or the like, floated to the surface, so that a wax coating resulted. The application of a subsequent wax coating was also practised. This, to a limited extent, met the abovementioned requirements. The surface layer of wax is however not durable and disappears relatively rapidly during use of the products, which again leads to greater wear. Moreover, such a wax layer can easily be damaged during assembly operations.

As stated, there has hitherto not been a good solution which is at the same time relatively reasonably priced.

To improve the situation, thick, wear-resistant layers have been sought and this has led to coating with layers of a plastics melt or covering with sheets of, for example PVC. This approach meets a number of important requirements, but is very expensive.

An object of the invention is, inter alia, to provide a coating which combines in itself all the desired properties and in particular a lacquer which moreover, in respect of wear resistance and appearance of the final lacquer layer, can be adapted to specific wishes or requirements.

For this purpose, the invention provides a lacquer which comprises a lacquer binder, a finely divided, high-molecular, inert, non-elastomeric wear-resistant plastics material which is insoluble in the lacquer, especially a synthetic linear polyamide of the nylon type, a polyimide or a comparable plastics, in the form of disperse particles each having a diameter of 2-200 microns, preferably 10-100 microns and more especially 10-40 microns, and optionally one or more solvents, pigments and/or other conventional lacquer ingredients.

The amount of these particles, calculated relative to the non-volatile part of the wet lacquer, can vary from 10 to 40% by volume, and these particles can, if desired, themselves contain a pigment or a UV stabiliser.

The amount of plastic particles, calculated relative to the wet lacquer, can vary from 5 to 40% by volume, and these particles can contain 0-40% by weight of pigment. The amount of volatile constituents in the wet lacquer is preferably from 10 to 70% by weight, the non-volatile constituents consisting, to the extent of 10-40% by volume, of the plastic particles. The film-forming part of the lacquer can itself contain 0-40% by weight of pigment.

In practice, the amount of plastic particles lying at the surface of the lacquer layer can be regulated by appropriate choice of the size and quantity of plastic particles in the lacquer, their shape, and the thickness of the wet lacquer layer applied, as well as by the content of solvent in the lacquer.

The invention also provides articles provided with one or more layers of which at least the top lacquer layer contains inert, high-molecular, non-elastomeric, wear-resistant, particles, dispersed in the layer, and having a diameter of 2-200 microns and which, at least partially, protrude from the lacquer layer. These plastics particles preferably form 10-40% by volume of this layer.

The properties of the particle material and the size and shape of the particles have the effect that after drying or hardening of the lacquer, for example by evaporation of the solvent, at least the majority of the plastic particles present protrude above the layer of binder. The consequence of this is that the factors which cause wear exert their wearing action in the first instance on the highest parts of the particles protruding from the layer, so that the actual lacquer layer remains spared. As a result, good wear resistance can be imparted to a lacquer layer.

The binder must of course be so chosen that in that wet lacquer the plastic particles are well wetted, so that the particles remain in suspension, and, after drying or hardening, the binder adheres well to these particles. This is however automatically the case with most binders, so that it hardly constitutes a restriction on the use of the invention. In particular, a polyester is a very suitable binder.

It has been found that lacquer can be produced both in an air-drying and in a stoving version, without any change in the applicability of the invention.

Since the quantity of plastic particles can be large, the lacquer surface can be very tightly arrayed with these particles. The scratch resistance is then very good. However, even with a relatively sparse array the scratch resistance is already greatly improved.

On bending lacquered panels, provided with the lacquer according to the invention, the flexibility is found to be substantially better as compared with panels carrying the same lacquer without the plastic particles. It even proves possible, in many cases, to bend a metal panel, lacquered with a lacquer according to the invention, through 180° (=T0, i.e. to nearly zero radius of curvature), without the lacquer layer exhibiting cracks.

The plastics used for the particles are inert and non-elastomeric, have a high molecular weight and do not dissolve in, or react with, the binder used. Polyamides which conform to the definition include, for example, nylon 6, nylon 7, nylon 9, nylon 11, nylon 12, nylon 13, nylon 6:6, nylon 6:10, nylon 13:13, nylon 6:13 or mixtures thereof. These all have a softening point of at least 180° C. and some of up to 270° C. Nylon 11 and nylon 12 are particularly suitable because of their relatively low melting point. Polyimides are also found to be suitable and, in certain cases, so is polytetrafluoroethylene.

It is very appropriate to prepare, according to the invention, stoving lacquers which are suitable for stoving temperatures of up to 300° C., and for stoving times which can vary from 15 seconds to 30 minutes, depending on the temperature used. The melting point of the plastics mentioned is so high that it is possible to effect stoving without these plastic particles melting or softening.

According to a preferred embodiment of the invention, the stoving temperature is, however, chosen to be so high that softening of the plastic particles occurs, as a result of which these particles become rounded through partial melting. This rounding is found to produce a reduction of the coefficient of friction, which reduction is frequently useful.

According to another preferred embodiment of this process, the stoving is carried out at such a high temperature and for such a long period that the particles protruding from the layer flow, under controlled melting, in such a way that the protruding particles approximately assume the shape of flattened nail heads, which rest with the edges of the head on top of the binder and cover a part of the layer of binder. If the lacquer is intended for use in the open, it is very desirable to employ plastic particles which contain a UV stabiliser which is in itself known. This stabiliser not only protects the plastic particles but also the lacquer layer below them against degradation by UV light, and thereby increases the life of the lacquer layer. Moreover, in this embodiment, the lacquer layer obtained becomes more resistant to weathering factors and to wear, and, furthermore, soiling is greatly reduced.

In the last two embodiments it is particularly advantageous, especially in "coil coating", to employ a polyamide having a relatively low softening point, such as nylon 11 or nylon 12.

The processability of the lacquers according to the invention is virtually the same as that of known lacquers. They can be processed by means of a brush, by spraying, by means of a paint roller or by some other conventional method, and are then dried in air or, as in the case of the stoving embodiments, are stoved at conventional or, if desired, higher temperatures.

At a particle size of between 2 and 200 microns it is found that after drying a large proportion of the particles protrude from a lacquer layer of conventional thickness (for example 10–20 microns in the case of "coil coating"). The protruding volume of the particles depends, inter alia, on the particle size and particle content of the lacquer and on the composition of the binder and solvent and can thus be adjusted through these parameters. Depending on the size and shape of the particles, a surface of varying structure is obtained. With particles of about 20 micron, a surface with good gloss is obtained, whilst the gloss diminishes as the particles become coarser. The amount of particles employed also of course affects the gloss. Furthermore, the particles are preferably so small that at least a large proportion of each particle remains within the layer of binder, so that the particles remain better anchored.

In order to achieve the same wear resistance, a larger quantity of fine particles generally has to be added than of the coarser particles.

The invention is explained below but not restricted by the examples which follow.

In these examples, the lacquer is a stoving lacquer which is used in so-called "coil coating". In this process, a layer of lacquer is applied, by means of a coating roller, to one or both sides of an aluminium strip which is supplied from a roll, after which the strip is passed continuously through a muffle furnace, where the strip is heated to a temperature (measured as the temperature of the metal) of which the maximum value (PMT) is given in each example. The residence time in the muffle furnace is about 30 seconds. During heating, the solvent evaporates, after which the strip is cooled and is wound up again to form a roll. During rolling up, the lacquer layer is already dry and hardened.

If desired, it is also possible to employ more than one such lacquering station, for example in order to apply a special primer or in order to lacquer the rear face in a different colour.

EXAMPLE I (a) Not according to the invention:

A coloured primer layer (20 micron thick), containing, as the binder, a commercial polyester prepared from neopentyl glycol and phthalic anhydride, dissolved at a concentration of 60% by weight in Solvesso 100 (a commercial aromatic petroleum fraction) is first applied to an 0.4 mm thick aluminium strip. On top of this is applied, using the same mixture of binder and solvent, a colourless top layer (15 micron thick). The lacquered strip is stoved for 30 seconds. The PMT is 230° C. Using this procedure, results are obtained which hitherto have been regarded as acceptable for exterior work.

The properties of the layer obtained are as follows:
Flexibility: T 2: no cracking in the lacquer after bending around a mandrel having a diameter of twice the panel thickness. [That is to say, at T0 (complete 180° bend, mandrel diameter 0) and at T1 (mandrel diameter equal to one panel thickness) the lacquer showed cracks and crazing].
Pencil hardness: H
Solvent resistance: Slight attack after 30 double rubs (1 double rub means: rub once forward and once back again with an acetone-soaked cottonwool pad).
Stability to UV light: After 1,000 hours in an Uvcon weatherometer, moderate yellowing and slight cracking. Gloss loss about 40%.
Wear resistance: Moderate
Appearance: Smooth and glossy
Gloss: 85 Gardner 60°/60° units.

(b) According to the invention:
A colourless layer of the same binder/solvent mixture as in (a) is applied to the same substrate, but 15% by volume, based on the said mixture, of UV-stabilised nylon 11 particles of size 10–40 micron are added. The lacquering and stoving is carried out exactly as under (a).
Flexibility: T0, no cracking in the lacquer, that is to say the panel can be bent double without using a mandrel, without thereby damaging the lacquer.
Pencil hardness: 4H
Solvent resistance: More than 100 double rubs with acetone
Stability to UV light: After 1,000 hours Uvcon, hardly any yellowing and no cracking. Reduction in gloss about 8%.
Wear resistance: Excellent
Appearance: Structured, slightly matted
Gloss: 30–32 Gardner 60°/60° units.

EXAMPLE II (a) Not according to the invention:
As in Example (Ia).

(b) According to the invention:
The same primer layer and top layer as in Example (1a) are used. However, 30% by volume of UV-stabilised nylon 12 particles, which are in the main smaller than 20 micron and round, are added in the present case. The lacquering and stoving are carried out as in Example (1).

The results are:
Flexibility: T0, no cracking in the lacquer
Pencil hardness: 3H
Solvent resistance: More than 100 double rubs with acetone
Stability to UV light: After 1,000 hours Uvcon, hardly any yellowing and no cracking. Reduction in gloss about 8%.
Wear resistance: Excellent
Appearance: Smooth surface, with gloss
Gloss: 40–45 Gardner 60°/60° units

EXAMPLE III (a) Not according to the invention:
A top layer of a lacquer obtained by dissolving a commercial polyurethane lacquer (VEBA 1256), which contains an opacifying amount of pigment, in Solvesso (a petroleum fraction), is applied in the same manner as in Example (Ia). The layer was again stoved as in Example (Ia).

The results are:
Flexibility: T1, no cracking in the lacquer
Pencil hardness: 2H
Solvent resistance: 40 double rubs which acetone
Stability to UV light: After 1,000 hours Uvcon, discolouration with 3NBS units. About 70% reduction in gloss.
Wear resistance: Moderate
Appearance: Glossy, smooth surface
Gloss: ±82 Gardner 60°/60° units.

(b) According to the invention:
25% by volume of white-pigmented nylon 11 particles with a particle size of less than 20 micron and having an irregular shape are added to the same lacquer. The lacquer is processed in the same manner.

The properties are now:
Flexibility: T0, no cracking in the lacquer P1 Pencil hardness: 4H
Solvent resistance: More than 100 double rubs with acetone
Stability to UV light: After 1,000 hours Uvcon, discolouration with 0.9 NBS units. About 15% reduction in gloss.
Wear resistance: Excellent
Appearance: (Very slightly structured surface with satin gloss
Gloss: 30—30 Gardner 60°/60° units.

We claim:
1. A process for producing a lacquered article which comprises the steps of applying one or more layers of lacquer to an article by which at least the top layer comprises a stoving lacquer having a binder, a finely divided, high molecular weight, inert non-elastomeric highly wear-resistant plastic material which is insoluble in the stoving lacquer in the form of dispersed particles each having a diameter of 2–100 microns, and where the stoving lacquer may be stoved at stoving times extending between 15 seconds and 30 minutes and at stoving temperatures up to 300° C., and where the majority of said particles protrude at least partially from an outermost layer of said stoving lacquer;
subjecting the outermost layer of the stoving lacquer on the article to a temperature above the softening point of the particles; and
maintaining said temperature to partially melt parts of the particles protruding from the outermost layer to cause said parts to take a rounded form and to flow out over the surface of the outermost layer in the vicinity of the particles where the outermost layer is in at least a partially dried or hardened state.

2. A process according to claim 1 including the additional step of shaping the article to a desired shape after stoving of the lacquer.

3. A process according to claim 1 wherein said plastic material is a synthetic linear polyamide.

4. A process according to claim 1 in which the particles have a diameter of 10–40 microns.

5. A process according to claim 1 wherein said particles comprise 10–40 percent by volume based on non-volatile ingredients of said stoving lacquer and the particles contain 0–40 percent by weight of a pigment.

6. An article made by the process of any one of claims 1 and 2–5.

* * * * *

UNITED STATES PATENT AND TRADEMARK OFFICE
CERTIFICATE OF CORRECTION

PATENT NO. : 4,457,965
DATED : Jul. 3, 1984
INVENTOR(S) : Johan P. Rocholl and Hendrikus De Jong It is certified that error appears in the above-identified patent and that said Letters Patent is hereby corrected as shown below:

ON THE TITLE PAGE:   [75] Inventors: line 2

"Hendrikes" should read --Hendrikus--;

at [73] Assignee: line 2

"Netherlands" should read --Curacao, Netherlands Antilles--.

Signed and Sealed this

Tenth Day of May, 1988

Attest:

DONALD J. QUIGG

*Attesting Officer*    *Commissioner of Patents and Trademarks*